3,388,146
CARBAZINATE DERIVATIVES
Adel F. Halasa, Akron, Ohio, assignor to The Firestone Tire & Rubber Company, Akron, Ohio, a corporation of Ohio
No Drawing. Filed Oct. 24, 1965, Ser. No. 504,984
6 Claims. (Cl. 260—455)

This invention relates to new carbazinate derivatives. The new compounds have the formula

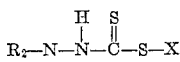

in which each R is a straight or branched chain alkyl group of 1 to 4 carbon atoms, and in which X is selected from the class consisting of:

(a) phenylthioformyl and
(b) phenyl, benzyl and benzoyl in which the benzene ring is substituted by one or more nitro groups in any one or more positions, and in positions not substituted by a nitro group there is no substituent or one or more substituents from the class consisting of (a) halogens, (b) phenyl, (c) nitrile, (d) hydroxy, (e) —$NR_2$ in which each R is selected from the class consisting of hydrogen and straight- or branched-chain alkyl groups of 1 to 4 carbon atoms, and (f) straight- and branched-chain and cyclic alkyl groups of 1 to 6 carbon atoms.

The rubber may be natural rubber or a synthetic polymer of a hydrocarbon diene of 4 or 5 carbon atoms which is a homopolymer or a copolymer of such dienes and also a copolymer of butadiene with styrene.

Representative accelerators include the following:

4-nitrophenyl 1,1-dimethyldithiocarbazinate
4-nitrophenyl 1,1-diisopropyldithiocarbazinate
4-nitrophenyl 1,1-sec-butyldithiocarbazinate
4-nitrophenyl 1,1-di-sec-butyldithiocarbazinate
4-nitrophenyl 1,1-di-t-butyldithiocarbazinate
2,4-dinitrophenyl 1,1-diethyldithiocarbazinate
4-nitrophenyl 1,1-di-sec-butyldithiocarbazinate
3,5-dinitrobenzyl 1,1-dimethyldithiocarbazinate
2,6-dinitrophenyl 1,1-di-n-propyldithiocarbazinate
2-nitrophenyl 1,1-n-dibutyldithiocarbazinate
2,5-dinitrobenzoyl 1,1-diethyldithiocarbazinate
3,5-dinitrobenzoyl 1,1-diethyldithiocarbazinate
2-nitro-4-chloro-phenyl 1,1-di-n-butyldithiocarbazinate
2,6-dinitro-3-hydroxy-4-bromo-phenyl 1,1-diethyldithiocarbazinate
2-nitro-4-cyanophenyl 1,1-di-t-butyldithiocarbazinate
2-nitro-biphenyl 1,1-dimethyldithiocarbazinate
3-amino-4-nitrophenyl 1,1-diethyldithiocarbazinate
2-methyl-4-nitrophenyl 1-1-di-n-propyldithiocarbazinate
2-nitro-4-cyclohexyl 1,1-di-n-butyldithiocarbazinate
2-nitrobenzyl 1,1-diethyldithiocarbazinate
S-(phenylthioformyl) 1,1-dimethyldithiocarbazinate
S-(alkylthioformyl where "alkyl" is 1 to 4 carbon atoms) 1,1-diethyldithiocarbazinate
S-(cyclohexylthioformyl) 1,1-di-n-propyldithiocarbazinate
S-(biphenylthioformyl) 1,1-di-t-butyldithiocarbazinate The dithiocarbazinates are prepared by the reaction of one mole of unsymmetrical dialkyl hydrazine with one mole of carbon disulfide in an aqueous medium containing 1 mole of sodium hydroxide at a temperature usually above ambient temperature (about 20° C.) and not in excess of 45 or 50° C. or thereabout. After the sodium salt of the carbazinate has been thus formed the monohalogen (preferably the monochloro) derivative of the compound which is to react with the carbazinate is added and the resulting product is precipitated out of the reaction mixture as it forms. After the halogen compound is added the reaction temperature is kept between about 25 and 50° C., and preferably between 35 and 40° C. Identification of the products referred to herein was made by elemental analysis as well as by studying infrared and NMR (Nuclear Magnetic Resonance) spectra.

The following examples are illustrative:

Example 1.—2,4-dinitrophenyl 1,1-dimethyldithiocarbazinate

Reactants used: Moles
  N,N-dimethylhydrazine _____ 0.20
  NaOH _____ 0.20
  $CS_2$ _____ 0.20
  2,4-dinitrochlorobenzene _____ 0.20

A solution of 8.0 grams of NaOH and 12.0 grams of N,N-dimethylhydrazine in 100 ml. of water was made in a three-neck, round-bottom flask. To this solution was added 14.0 grams of $CS_2$ with cooling to 0° C. The solution warmed up to 30° C. and was stirred during heating and for about one hour. The color changed. During one additional hour of stirring, 40 grams of 1-chloro-2,4-dinitrobenzene in 200 ml. of ethyl alcohol were added. The solution turned a deep red. It was stirred over night. Yield was 42 grams, 70 percent, which on recrystallization yielded 2,4-dinitrophenyl 1,1 - dimethyldithiocarbazinate with a melting point of 196–197° C.

Example 2.—4-nitrobenzyl 1,1-dimethylcarbazinate

Example 1 was repeated, but using p-nitrobenzylchloride. It yielded 98 percent of yellow solid with a melting point of 182–186° C. The elemental structure as determined was in agreement with the following:

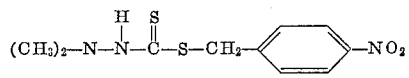

Example 3.—S-(phenylthioformyl) 1,1-dimethyldithiocarbazinate

Reactants used: Moles
  N,N-dimethylhydrazine _____ 0.20
  NaOH _____ 0.20
  $CS_2$ _____ 0.20
  Phenylchlorothioformate _____ 0.20

A solution of 12.0 grams of $H_2N.N(CH_3)_2$ and 8.0 grams of NaOH in 150 ml. of water was placed in a three-neck, round-bottom flask, cooled to 50° C., and then 15.0 grams $CS_2$ was added. No reaction occurred. The solution was warmed to 35–40° C. to reflux the $CS_2$, with stirring for 2–3 hours and a homogeneous solution was obtained. This was cooled to 0° C. by a wet ice bath and 34.4 grams of phenylchlorothioformate was added slowly and the solution turned red. The color changed to yellow with a phase separation. Then 200 to 250 ml. tetrahydrofuran was added to the reaction mixture in the flask, with constant stirring. The reaction mixture was stirred for 2 hours. Upon evaporation of the tetrahydrofuran the reaction mixture gave a yellowish precipitate, which when recrystallized from isopropyl ether yielded a product of the following formula with a melting point of 149–151° C.:

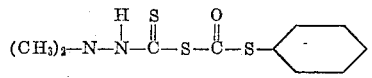

It is unexpected that these dithiocarbazinates are active in rubber because compounds of the dithiocarbamate series having the formula

are as a rule inactive. They decompose with formation of thioureas and sulfides such as hydrogen sulfide, etc.

Representative compounds were tested as accelerators. The results are recorded in the following table in which the following identifications are used:

Test 1=2,4-dinitrophenyl 1,1-dimethyldithiocarbazinate
Test 2=Phenylthioformyl 1,1-dimethyldithiocarbazinate
Test 3=4-nitrobenzyl 1,1-dimethyldithiocarbazinate The formula of the masterbatch in each test was:

| | Parts by wt. |
|---|---|
| Emulsion-formed butadiene-styrene copolymer (SB–R) | 100 |
| HAF black | 50 |
| Zinc oxide | 3.0 |
| Stearic acid | 2.0 |
| Phenyl-beta-naphthylamine | 0.6 |
| Oil | 8.0 |
| | 163.6 |

The cures were effected at 300° F., and the results obtained on 20- and 40-minute cures are recorded below:

| | TEST 1 | TEST 2 | TEST 3 |
|---|---|---|---|
| Masterbatch | 163.6 | 163.6 | 163.6 |
| Accelerator | 1.2 | 1.2 | 1.2 |
| Cepar Parameters:[1] | | | |
| Time to 90% cure, 340° F., min | 7.9 | 9.4 | 12.4 |
| Cure Constant K | 0.554 | 0.364 | 0.245 |
| Mooney Scorch at 265° F.: | | | |
| T's (Vm+1) | 31 | >40 | 23.5 |
| T's (Vm+10) | >40 | >40 | >40 |
| Vm | 24.0 | 24.0 | 22.5 |
| Physical properties: | | | |
| 300% Modulus, p.s.i.: | | | |
| Cure:[2] | | | |
| 20' | | 200 | [2]NC | 125 |
| 40' | | 725 | 175 | 350 |
| 400% Modulus, p.s.i.: | | | |
| Cure: | | | |
| 20' | 325 | NC | 150 |
| 40' | 1,225 | 625 | 600 |
| Tensile Strength, p.s.i.: | | | |
| Cure: | | | |
| 20' | 525 | NC | 225 |
| 40' | 1,925 | 1,125 | 975 |
| Ultimate Elongation, percent: | | | |
| Cure: | | | |
| 20' | 760 | NC | 620 |
| 40' | 600 | 660 | 480 |

[1] The Cepar apparatus II by Claxton et al., Rubber World, 143, 71, May 1961.
[2] NC stands for No Cure.

The foregoing results show that these new compounds are good delayed-action accelerators.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. One or more accelerator activator is often used with any of the accelerators mentioned, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Vulcanization is usually accomplished by heating a vulcanizable rubber composition at a temperature in the range of 240 to 400° F. for a time ranging from several hours to a few seconds.

Any suitable amount of the accelerator will be used, depending upon the rubber and the use to which the rubber is to be put.

What I claim is:

1. A compound having the formula

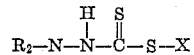

in which each R is a straight- or branched-chain alkyl group of 1 to 4 carbon atoms, and in which X is selected from the class consisting of:

(a) phenylthioformyl and
(b) phenyl, benzyl and benzoyl in which the benzene ring is substituted by one or more nitro groups in any one or more positions, and in positions not substituted by a nitro group there is no substituent or one or more substituents from the class consisting of (a) chloro, (b) phenyl, (c) nitrile, (d) hydroxy, (e) —NR$_2$ in which each R is selected from the class consisting of hydrogen and straight- or branched-chain alkyl groups of 1 to 4 carbon atoms, and (f) straight- and branched-chain and cyclic alkyl groups of 1 to 6 carbon atoms.

2. A compound of claim 1 in which X is an aryl group of the class consisting of phenyl, benzyl and benzoyl having a nitro group in the 4-position.

3. A compound of claim 1 in which X is an aryl group of the class consisting of phenyl, benzyl and benzoyl having nitro groups in the 2- and 4-positions.

4. 2,4-dinitrophenyl 1,1-dialkyldithiocarbazinates in which the alkyl groups each contain 1 to 4 carbon atoms.

5. S-(phenylthioformyl) 1,1-dialkyldithiocarbazinates in which each alkyl group contains 1 to 4 carbon atoms.

6. 4-nitrobenzyl 1,1-dialkyldithiocarbazinates in which each alkyl group contains 1 to 4 carbon atoms.

References Cited

UNITED STATES PATENTS 3,244,501   4/1966   D'Amico _____ 71—100
3,284,482   10/1966  D'Amico et al. _____ 260—455

CHARLES B. PARKER, *Primary Examiner.*

D. R. PHILLIPS, *Assistant Examiner.*

UNITED STATES PATENT OFFICE
CERTIFICATE OF CORRECTION

Patent No. 3,388,146　　　　　　　　　　　　　　June 11, 1968

Adel F. Halasa

It is certified that error appears in the above identified patent and that said Letters Patent are hereby corrected as shown below:

Column 3, line 35, "175" should read -- 375 --.

Signed and sealed this 18th day of November 1969.

(SEAL)
Attest:

Edward M. Fletcher, Jr.　　　　　　　　　　WILLIAM E. SCHUYLER, JR
Attesting Officer　　　　　　　　　　　　　　Commissioner of Patents